United States Patent [19]
McCurdy et al.

[11] 3,945,976
[45] Mar. 23, 1976

[54] PROCESS FOR PRODUCING IMPACT RESISTANT POLYMER

[75] Inventors: John L. McCurdy, South Laguna, Calif.; Norman Stein, Flossmoor, Ill.

[73] Assignee: Standard Oil Company, Chicago, Ill.

[22] Filed: Nov. 30, 1973

[21] Appl. No.: 420,454

Related U.S. Application Data

[62] Division of Ser. No. 165,335, July 22, 1971, abandoned, which is a division of Ser. No. 763,537, Sept. 30, 1968, abandoned.

[52] U.S. Cl............. 260/33.6 AQ; 23/260; 23/285; 260/95 R; 260/95 C; 260/695; 260/698; 260/700; 260/880 R
[51] Int. Cl.[2]..... B01J 8/00; C08K 5/01; C08L 9/06
[58] Field of Search............ 260/95 R, 95 C, 880 R, 260/695, 698, 700, 33.6 AQ; 23/260, 285

[56] References Cited
UNITED STATES PATENTS

| | | | |
|---|---|---|---|
| 2,496,653 | 2/1950 | Allen et al............. | 260/93.5 |
| 2,530,409 | 11/1950 | Stober et al............ | 260/93.5 |
| 2,600,871 | 6/1952 | Helwig................... | 23/285 |
| 2,630,302 | 3/1953 | Jones.................... | 259/6 |
| 2,694,692 | 11/1954 | Amos et al............. | 260/880 R |
| 2,727,884 | 12/1955 | McDonald et al..... | 260/93.5 |
| 2,758,915 | 8/1956 | Vodonik................ | 23/285 |
| 2,894,824 | 7/1959 | Lanning................ | 23/285 |
| 2,976,131 | 3/1961 | Milne................... | 23/285 |
| 3,057,702 | 10/1962 | Pierce et al............ | 23/285 |
| 3,243,481 | 3/1966 | Ruffing et al......... | 260/880 R |
| 3,245,762 | 4/1966 | Ullrich et al.......... | 23/285 |
| 3,284,542 | 11/1966 | Carrock et al........ | 260/880 R |
| 3,337,508 | 8/1967 | Bachmann et al..... | 260/75 |
| 3,373,186 | 3/1968 | Bachmann et al..... | 260/475 |
| 3,397,876 | 8/1968 | Valle................... | 266/22 |
| 3,428,712 | 2/1969 | Carrock et al........ | 260/880 |
| 3,469,948 | 9/1969 | Anderson et al...... | 23/285 |
| 3,476,523 | 11/1969 | Leybourne............ | 23/285 |
| 3,495,951 | 2/1970 | Tanaka et al......... | 23/285 |
| 3,498,754 | 3/1970 | Yamashita et al.... | 23/285 |
| 3,522,018 | 7/1970 | Bachman et al...... | 23/285 |
| 3,524,730 | 8/1970 | Yokouchi et al...... | 23/285 |
| 3,526,484 | 9/1970 | Kilpatrick............. | 23/285 |
| 3,563,710 | 2/1971 | Dew et al............. | 23/285 |

FOREIGN PATENTS OR APPLICATIONS
42-4474   7/1967   Japan

OTHER PUBLICATIONS

Emejota Eng. Corp. Bulletin–Factory Polystyrene Plants (undated).
Jenkins–Oil & Gas J. (Jan. 18, 1965), 78–82, 85–86.
Encyc. Pol. Sci. & Techn. (vol. 2), 612–619, 650–666; vol. 13, 196–206; (1965 & 1970) (Wiley) (N.Y.).
Livingston–European Chem. Newsplant Supp. (Sept. 10, 1965) 70, 72.
British Plastics 30, 26–27, Jan. 1957.
Boundy et al.–Styrene (Reinhold) (N.Y.) (1952), pp. 266–274.
German Plastics Practice–DeBell et al. (Dept. Comm.) (1946) pp. 13–39.
Teach Stal–Polystyrene (Reinhold) (N.Y.) (1960) pp. 60–61.

*Primary Examiner*—Melvyn Marquis
*Assistant Examiner*—H. H. Fletcher

[57] ABSTRACT

Our invention concerns a continuous process for producing an impact resistant polymer wherein a vinyl aromatic compound and rubber are mass polymerized under increasing temperature conditions. The reacting mass flows through multiple reactors providing distinct reaction zones wherein specific reaction conditions are maintained.

6 Claims, 1 Drawing Figure

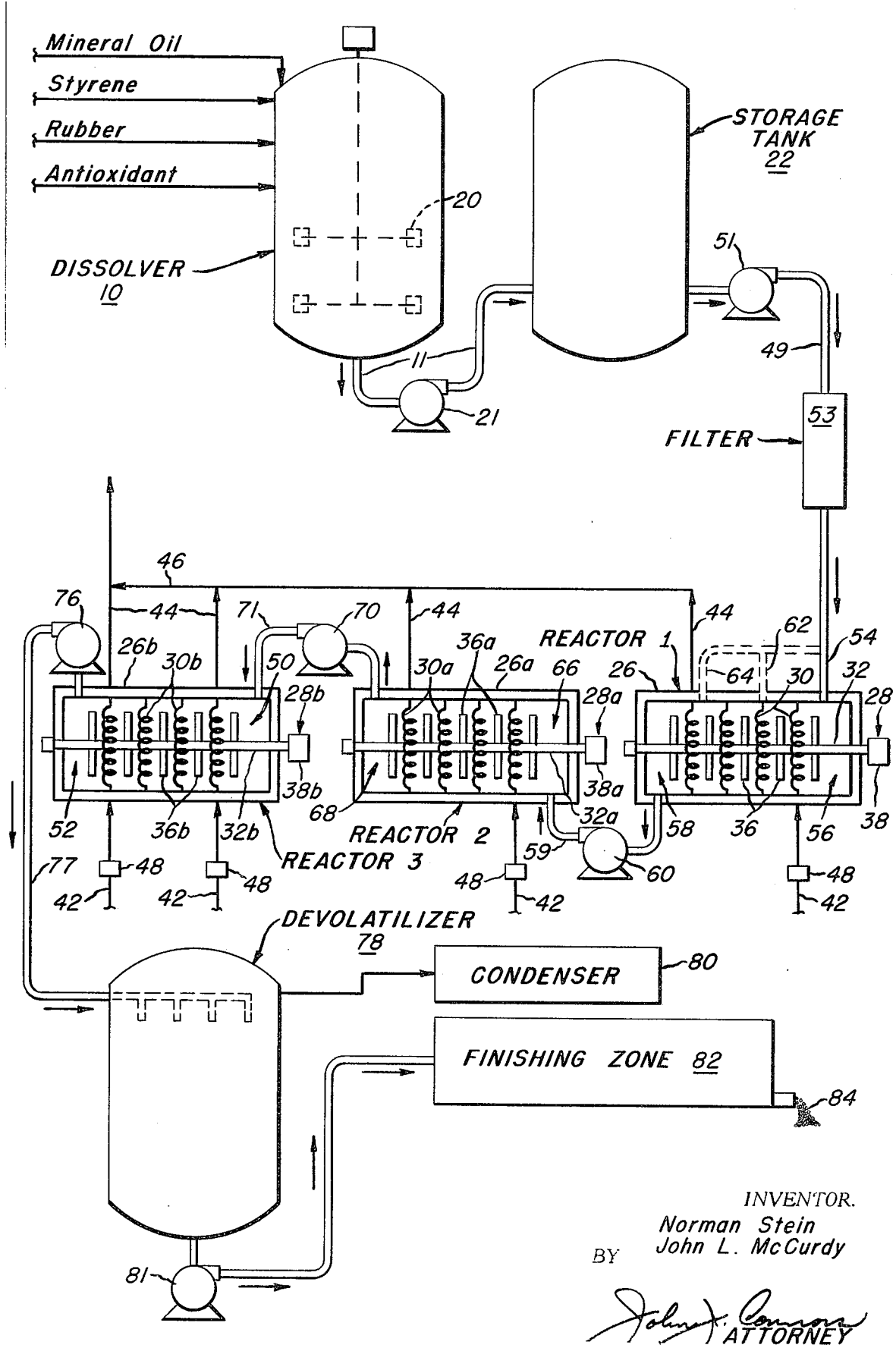

PROCESS FOR PRODUCING IMPACT RESISTANT POLYMER

This is a division of application Ser. No. 165,335, filed July 22, 1971, now abandoned, which is a division of application Ser. No. 763,537, filed Sept. 30, 1968, now abandoned.

BACKGROUND OF THE INVENTION

Impact resistant polymers can be produced by polymerizing a major amount of vinyl aromatic compounds with a minor amount of rubber. Many different types of vinyl aromatic compounds and rubbers may be used, and are well known to those skilled in the art. In a polymerizing mixture, some of the vinyl aromatic compound polymerizes to form homopolymer, while the rubber may react with either such homopolymer or with monomer to form grafted copolymer. Impact resistant polymers appear to comprise a mixture of homopolymer and copolymer wherein the copolymer is distributed throughout the mass. Generally, only a small amount of rubber is used, for example, about 10 percent by weight or less, but this is sufficient to impart impact strength to the total polymer mass.

BRIEF DESCRIPTION OF THE INVENTION

We have discovered an improved process for making impact resistant polymers from a feed free of inert solvent for the rubber and vinyl aromatic reactants. Although it is desirable to add a small amount of an internal lubricant and an antioxidant to the feed, we have found that the feed need not be diluted with an inert solvent for the rubber and vinyl aromatic reactants. Hitherto it was considered that heat transfer problems were so great in a polymerizing vinyl aromatic monomer and rubber mixture that addition of a diluting solvent was necessary.

In our process, polymerization is conducted in multiple separate reactors, preferably three, in order to facilitate reaction control. The feed may be fed into the first reactor from two or more different points. This can aid in control of temperatures in the first reactor where a runaway reaction is most likely to occur. The temperature in the first reactor is desirably maintained in the range of from 200° to 260°F., preferably from 220° to 255°F.; the temperature in the second reactor is from 240° to 285°F., preferably from 245° to 270°F.; and the temperature in the third reactor is from 280° to 480°F., preferably in the range of from 310° to 445°F. The third reactor preferably has two separate temperature regions, the first region being within the range of from 280° to 395°F., preferably from 320° to 355°F., and the second region being within the range of from 375° to 480°F., preferably from 400° to 445°F.

The reacting mass is slowly stirred as it moves through the reactors to establish a substantially uniform temperature throughout the mass. Depending on the properties desired in the polymer, such as the degree of distribution of components and molecular weight variations which are dependent on temperature control, it is sometimes desirable to decrease the stirring rate as the reacting mass moves into high temperature zones.

Flow through the reactors is controlled, for example, in the range of 2 to 4 pounds fluid reaction mass per hour per cubic foot of reactor volume, so that effluent from the first reactor comprises from 10 to 35 weight percent polymer in solution with unreacted vinyl aromatic compound, effluent from the second reactor comprises from 35 to 60 weight percent polymer, and effluent from the third reactor comprises more than 95 weight percent polymer. The small amount of vinyl aromatic monomer in the polymer product withdrawn from the third reactor is removed by devolatilization. This improves the impact strength and other physical properties of the polymer product. Flow through the reactors is also controlled so that each increment of the reacting mass is subjected, for about the same time, to about the same temperature conditions. In other words, plug flow should be maintained throughout the reactors.

Although the composition of the feed may vary, we prefer a feed comprising a major amount of styrene monomer, preferably at least 85 parts by weight, and a minor amount of polybutadiene or styrene-butadiene rubber, preferably not more than 15 parts by weight. The feed may also contain minor amounts of an internal lubricant such as mineral oil and an antioxidant such as 2,6-di-(t-butyl)-4-methylphenol; 4-(t-butyl)-catechol; an admixture of tri-nonylphenyl phosphite, tri-dinonylphenyl phosphite, and tri-isopropanol amine; or mixtures thereof. We have found that small amounts, generally no more than 5 percent by weight, of these and other additives well known in the art may be added to the feed to improve flow, color, clarity, stability, etc. However, the bulk of the feed should consist essentially of the vinyl aromatic monomer and the rubber, and should be free of any inert solvent for the monomer and rubber.

The devolatilized polymer recovered from our process contains less than 0.5% uncombined vinyl aromatic compound, vinyl aromatic-rubber copolymer particles having a particle size greater than 1 micron but no greater than 20 microns, and is characterized by the following additional properties:

a. melt index greater than 1 gram/10 minutes, but no greater than 10 grams/10 minutes (ASTM D-1238),
b. Izod impact strength (unannealed) greater than 0.9 ft-lb/in (ASTM D-256),
c. heat distortion temperature greater than 155°F. (ASTM D-648),
d. percent elongation greater than 25 percent (ASTM D-638).

The percent uncombined vinyl aromatic compound is determined by conventional chromatographic techniques, and the distribution of the rubber-containing component is determined by conventional microscopic techniques.

DESCRIPTION OF THE DRAWING

Our invention is described below in greater detail with reference to the accompanying drawing in which the FIGURE is a schematic flow diagram illustrating our novel process.

DESCRIPTION OF THE PREFERRED EMBODIMENTS

Referring to the FIGURE, a feed is first prepared by mixing, at 95°F. in dissolver 10, styrene monomer, quarter-inch cubes of poly-1,3-butadiene rubber, mineral oil, and antioxidant. Mixer 20 inside dissolver 10 aids in dissolving the polybutadiene rubber and blends it with the other ingredients. After the feed is prepared, which takes about 8 hours, pump 21 moves it from dissolver 10 via conduit 11 to storage tank 22.

Polymerization of the feed is carried out in three, similarly constructed, carbon steel reactors 1, 2, and 3, having about the same volume capacity. Reactors 1, 2, and 3 comprise, respectively, cooling jackets 26, 26a, and 26b; stirring apparatus 28, 28a, and 28b inside the jackets; and internal cooling elements 30, 30a, and 30b disposed in a generally vertical plane transverse to the flow of the reacting mass. Cooling elements 30, 30a, and 30b may be any suitable configuration which provides spacings therein that allow free flow of the reacting mass through reactors 1, 2, and 3. We prefer to use internal cooling elements since these inhibit channeling of the reacting mass as it flows through reactors 1, 2, and 3.

Stirring apparatus 28, 28a, and 28b have, respectively, power shafts 32, 32a, and 32b coinciding with the central horizontal axes of the reactors and passing through openings (not shown) in cooling elements 30, 30a, and 30b. A plurality of impeller blades 36, 36a, and 36b are mounted respectively, on shafts 32, 32a, and 32b, and motors 38, 38a, and 38b drive these shafts, causing the blades to rotate thereby maintaining plug flow. Pumps 51, 60, 70 move the reacting mass through reactors 1, 2, and 3 in a generally horizontal direction.

As polymerization occurs inside reactors 1, 2, and 3, cooling fluid is pumped via inlet lines 42 into cooling jackets 26, 26a, and 26b, through cooling elements 30, 30a, and 30b, and out exit lines 44 into return line 46. Thermostats 48, disposed along inlet lines 42 and responding to the temperature of the reacting mass inside the reactors 1, 2, and 3, monitor the temperature inside the reactors and control the flow of cooling fluid such that the temperatures in the reactors are maintained within predetermined ranges. In reactor 1 the temperature ranges from 200° to 260°F.; and in reactor 2 it ranges from 240° to 285°F.; and in reactor 3 at forward end 50, it ranges from 280° to 375°F. and, at rear end 52, it ranges from 375° to 480°F. Pressures inside reactors 1, 2, and 3 range between 0 to 100 psig.

For startup, pump 51 initially moves the feed via conduit 49 through a filter 53 into reactor 1 at infeed station 54, filling up this reactor. Additional infeed stations 62 and 64, shown in dotted lines, can be used to introduce the feed into reactor 1. By pumping the feed into reactor 1 through a plurality of infeed station 54, 62 and 64, the temperature inside reactor 1 may sometimes be more readily controlled, depending on the temperature desired.

Polymerization now begins, and as polymer forms, motor 38 drives power shaft 32 at a rate of about 7 rpms. As the reacting mass moves from forward end 56 of reactor 1 to rear end 58 of reactor 1, from 10 to 35 weight percent of the mass is converted into polymer. The effluent of reactor 1 is pumped by pump 60 via conduit 59 into reactor 2. In reactor 2 motor 38a drives power shaft 32a at the rate of about 4 rpms. As the reacting mass moves from forward end 66 of reactor 2 to rear end 68 of reactor 2, the rate of polymerization increases, forming more polymer. The reacting mass withdrawn from rear end 68 comprises 35 to 60 weight percent polymer. A pump 70 feeds effluent from reactor 2 into reactor 3 via conduit 71. In reactor 3 motor 38b drives power shaft 32b at the rate of about 2 rpms. The effluent withdrawn from reactor 3 comprises more than 95 weight percent of the polymer product.

Pump 76 feeds effluent from reactor 3 into devolatilizer 78 via conduit 77. Devolatilizer 78 is maintained at a pressure of 7 millimeters of mercury and a temperature of 429°F. Any unreacted styrene vaporizes in devolatilizer 78, and the vapors pass into condenser 80 for recovery and recycle. Pump 81 withdraws devolatilized product from devolatilizer 78 and moves it through finishing zone 82 where it is converted into pellets 84.

The process of our invention has the dual advantages of being continuous and easy to control. Once reactors 1, 2, and 3 are filled to capacity and polymerization begins, they are kept full by continuously adding feed. The chemical composition of the pellets 84 remains virtually constant so long as reaction conditions and the feed's composition stays the same. Of course, the physical properties and chemical composition of pellets 84 can be easily altered by simply changing either the feed's composition or reaction conditions or both. Since these changes may readily be made, our process is highly versatile. On the other hand, since reaction conditions—once established—may be rigidly maintained, the product of the process can be of uniform quality.

The following table presents examples illustrating the versatility of our process:

| FEED (% by Wt.) | EX. I | EX. II | EX. III | EX. IV |
|---|---|---|---|---|
| Styrene | 89.1 | 89.1 | 89.1 | 90.1 |
| Polybutadiene | 6.5 | 6.5 | 6.5 | 6.5 |
| Mineral Oil | 4.0 | 4.0 | 4.0 | 3.0 |
| Antioxidant | 0.4 | 0.4 | 0.4 | 0.4 |
| FLOW RATE: | | | | |
| lbs/hr | 3,234 | 3,234 | 3,234 | 3,234 |
| lbs/hr/ft³ | 2.73 | 2.73 | 2.73 | 2.73 |
| REACTOR 1: | | | | |
| Temp., °F. | 220 | 219 | 214 | 216 |
| % Conversion | 22 | 14 | 11 | 12 |
| Stirrer, rpm | 7 | 7 | 7 | 7 |
| REACTOR 2: | | | | |
| Temp., °F. | 244 | 262 | 262 | 262 |
| % Conversion | 46 | 55 | 53 | 53 |
| Stirrer, rpm | 4 | 4 | 8 | 8 |
| REACTOR 3 (Forward End): | | | | |
| Temp., °F. | 325 | 325 | 325 | 325 |
| % Conversion | 82 | 82 | 86 | 77 |
| Stirrer, rpm | 2 | 2 | 2 | 2 |
| REACTOR 3 (Rear End): | | | | |
| Temp., °F. | 446 | 446 | 446 | 446 |

-continued

| FEED (% by Wt.) | EX. I | EX. II | EX. III | EX. IV |
|---|---|---|---|---|
| % Conversion | 97 | 97 | 97 | 97 |
| Stirrer, rpm | 2 | 2 | 2 | 2 |
| DEVOLATILIZER: | | | | |
| Pres. mm Hg | 25 | 25 | 25 | 25 |
| Temp., °F. | 437 | 437 | 437 | 437 |
| PROPERTIES: | | | | |
| Melt Index (gm/10 min.) | 3.7 | 2.9 | 4.2 | 2.5 |
| Izod Impact (ft-lb/in) | 1.4 | 1.7 | 1.3 | 1.7 |
| Elongation % | 32 | 34 | 35 | 31 |
| Heat Dist. Temp., °F. | 160 | 160 | 161 | 173 |
| % Uncombined Stryene | 0.2 | 0.2 | 0.2 | 0.2 |

The above examples have been presented merely to illustrate preferred embodiments of this invention. In similar fashion, different types of vinyl aromatic compounds and rubbers, well known in the art, can be used to prepare the feed, and reaction conditions can be varied in accordance with the properties desired in the final product.

We claim:

1. A continuous process for producing impact resistant styrene polymer comprising:
   a. forming a solution consisting essentially of an effective amount of not more than 15 parts by weight of polybutadiene or styrene-butadiene rubber, from 0 to about 5 parts of internal lubricant and antioxidant, and at least 85 parts of styrene monomer;
   b. pumping the solution into a first reactor comprising a horizontal cylindrical vessel surrounded by a cooling jacket and containing a plurality of internal cooling elements disposed in a general vertical plane transverse to the central horizontal axis of the reactor, a plurality of impeller blades interspaced between the cooling elements and mounted on and extending outward from a shaft positioned along the central horizontal axis of the reactor, and a means to rotate the shaft;
   c. forming a first reacting mass in the first reactor by initiating polymerization in the solution;
   d. establishing a first temperature zone within the first reactor of from 200° to 260°F. while slowly stirring the first reactor mass by the impeller blades such that a substantially homogeneous temperature is maintained throughout the reacting mass;
   e. continuously passing the first reacting mass through the first reactor, in a general horizontal direction while maintaining plug flow, at a rate such that an effluent comprising a 10 to 35 weight percent of polymer solution is withdrawn continuously from the first reactor;
   f. transferring the effluent from the first reactor into a second reactor of similar configuration to the first reactor to form a second reacting mass;
   g. establishing a second temperature zone within the second reactor of from 240° to 285°F. while slowly stirring the second reacting mass by the impeller blades such that a substantially homogeneous temperature is maintained throughout the reacting mass;
   h. continuously passing the second reacting mass through the second reactor, in a general horizontal direction while maintaining plug flow, at a rate such that an effluent comprising a 35 to 60 weight percent solution of polymer is withdrawn continuously from the second reactor;
   i. transferring the effluent from the second reactor into a third reactor of similar configuration to the first and second reactors to form a third reacting mass;
   j. establishing a third temperature zone within the third reactor of from 250° to 480°F. while slowly stirring the third reacting mass by the impeller blades such that a substantially homogeneous temperature is maintained throughout the reacting mass;
   k. continuously passing the third reacting mass through the third reactor, in a general horizontal direction while maintaining plug flow, at a rate such that an effluent comprising more than 95 weight percent of polymer is withdrawn continuously from the third reactor; and
   l. devolatilizing the styrene polymer withdrawn from the third reactor to remove unreacted styrene monomer, whereby the devolatilized styrene polymer contains less than 0.5 weight percent of uncombined styrene monomer, has a heat distortion temperature greater than 155°F., an Izod impact strength (unannealed) greater than 0.9 ft-lb/in, a melt index between 1 and 10 grams/10 minutes, and an elongation greater than 25 percent, and contains styrene-rubber copolymer particles having a particle size between 1 and 10 microns.

2. The process defined in claim 1 wherein said third zone has two separate temperature regions of from 280° to 375°F. and from 375° to 480°F., said third mass initially moving through said first region and then directly into said second region as said third mass flows through said zone.

3. The process defined in claim 2 wherein all three zones have about the same volume and the reacting masses flow through said zones at a constant rate ranging between 2 and 4 pounds of reacting mass per hour per cubic foot of zone volume.

4. The process defined in claim 3 wherein said reacting mass is stirred at a slower rate as it flows through said zones.

5. The process defined in claim 3 wherein said first mass is fed into said first zone from at least two points.

6. The process defined in claim 5 wherein the lubricant is mineral oil and the antioxidant is selected from the group consisting of 2,6, ditertbutyl-4-methylphenol; 4-tert-butylcatechol; an admixture of trimonononylphenyl phosphite, tri-dinonylphenyl phosphite and tri-isopropanol amine; or mixtures thereof.

* * * * *